United States Patent [19]

Mozzar

[11] 3,910,372

[45] Oct. 7, 1975

[54] AUTOMATIC ANTITHEFT LOCK FOR MOTOR VEHICLES

[76] Inventor: Morton Mozzar, 1018 Ardmore Road, Baldwin, N.Y. 11510

[22] Filed: Apr. 13, 1973

[21] Appl. No.: 350,994

[52] U.S. Cl. ............... 180/114; 70/255; 303/89; 307/10 AT
[51] Int. Cl.² ........................................ B60R 25/08
[58] Field of Search ............ 180/114; 70/255, 258; 303/89; 307/10 AT

[56] References Cited
UNITED STATES PATENTS

| | | | |
|---|---|---|---|
| 2,585,711 | 2/1952 | Whitney et al. | 303/89 X |
| 3,174,502 | 3/1965 | Howarth et al. | 180/114 |
| 3,559,755 | 2/1971 | Pond | 180/114 |
| 3,684,049 | 8/1972 | Kimura | 303/89 X |
| 3,720,284 | 3/1973 | Myers | 180/114 |
| 3,756,341 | 9/1973 | Tonkowich | 180/114 |
| 3,772,642 | 11/1973 | Schlorke | 180/114 |
| 3,773,138 | 11/1973 | Killmeyer | 180/114 |

*Primary Examiner*—David Schonberg
*Assistant Examiner*—John P. Silverstrim
*Attorney, Agent, or Firm*—Friedman & Goodman

[57] ABSTRACT

An antitheft device for all types of motor vehicles operates by automatically simultaneously locking the brake system and the fuel system and disconnecting the ignition system, thereby placing the entire vehicle out of commission every time the protected vehicle is turned off. The device can be effectively used both with the standard coil ignition system and with transistor-solid state system. The antitheft system works equally well with carburetor or fuel injection systems.

7 Claims, 4 Drawing Figures

AUTOMATIC ANTITHEFT LOCK FOR MOTOR VEHICLES

This invention relates to an antitheft device for all types of motor vehicles with hydraulic or air type brakes.

Existing antitheft devices are primarily concerned with means for preventing an intruder from turning on the ignition. However, if a vehicle is parked and the owner is not around, it is comparatively easy for a thief to release the manually operated parking brake and to pull away the vehicle by attaching it to another vehicle.

An object of the present invention is to prevent thefts or other unauthorized use of this nature through the provision of a device which will not only disconnect the ignition system but will also lock at the same time the brake system and the fuel system automatically.

Another object is the provision of a device of this nature which is inexpensive to install in all types of motor vehicles with hydraulic brakes and, being small in size, is therefore easy to handle during installation.

Other objects of the present invention will become apparent in the course of the following specification.

In the accomplishment of the objectives of the present invention it was found desirable to provide a device which includes a master unit provided with relays, switches and extended by wiring to the brake solenoid, fuel solenoid and ignition system. When the user turns off the ignition key while pressing on the brake, the device will be turned on automatically. To release the device the user merely inserts a special key into a lock provided on the dashboard and turns it to its off position.

The invention will appear more clearly from the following detailed description when taken in connection with the accompanying drawings showing by way of example only, preferred embodiments of the inventive idea.

Figure 1:
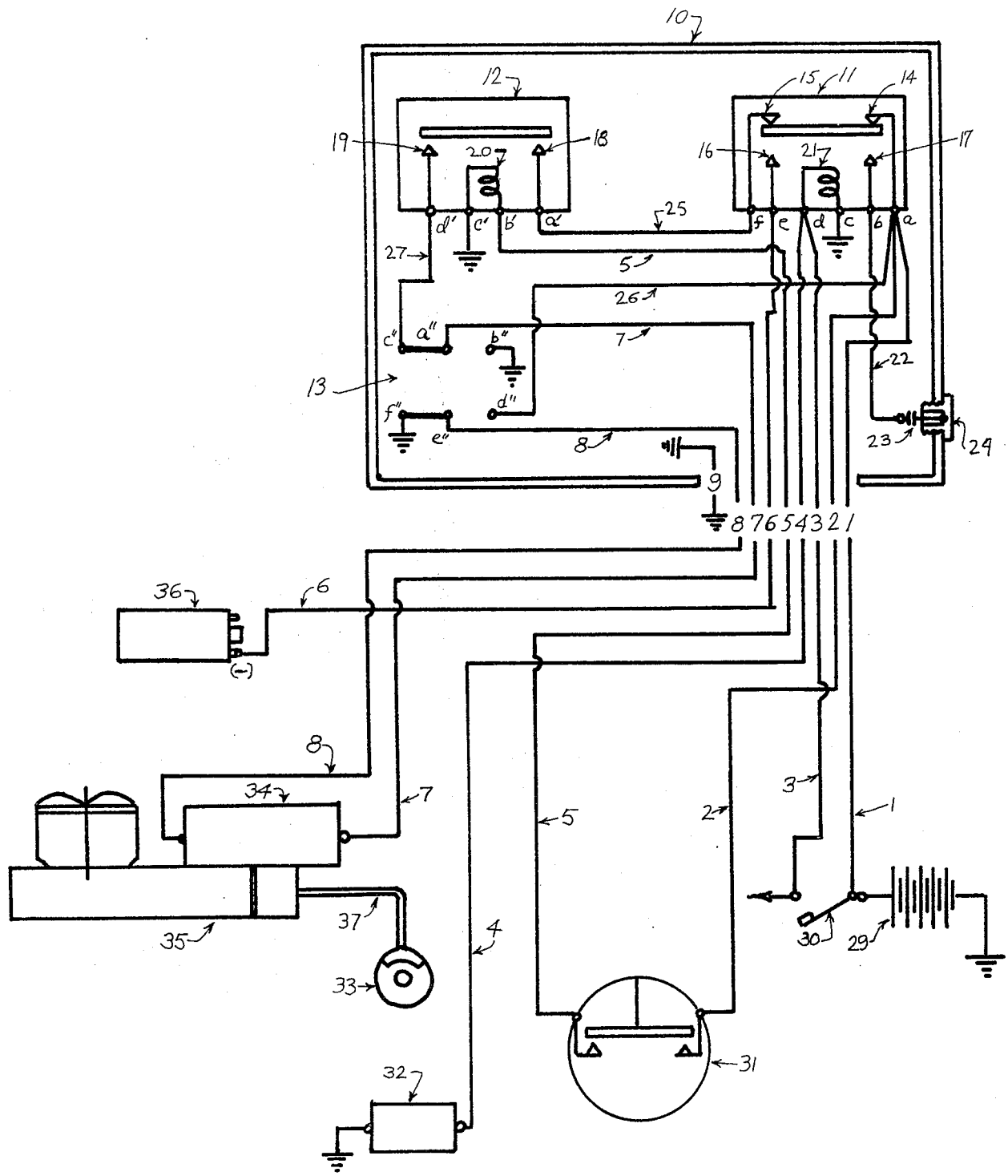
FIG. 1 is a diagram showing the device of the present invention in its on (normal) position.

The device of the present invention includes a housing 10 containing relays 11 and 12 and a double-pole, double-throw switch 13. Switch 13 is in the form of a a lock requiring a special key and has an integral spring to return it to the normal position when the key is released.

When the ignition switch 30 of the protected vehicle is closed (ignition on), current from a source of electrical energy in the form of a battery 29 flows through wire 3 and activates coil 21 of normally closed relay 11 within housing 10, then flows through terminal $d$ and out to ground on terminal $c$. Normally closed contact points 14 and 15 in relay 11 open and current no longer flows. Normally open contact points 16 and 17 make contact connecting terminals $b$ and $e$. Terminal $b$ connects via wire 22 to condenser 23 located in cap 24, part of housing 10. This is used with standard coil ignition systems. Terminal $e$ connects via wire 6 to the negative of distributor side of coil 36. Terminal $d$ of relay 11 connects to the fuel solenoid valve 32 via wire 4, opening it and permitting fuel to flow unobstructed.

To release the brake so the vehicle can be moved, the special key, which is the only key deactivating the entire device, must be inserted into the lock on switch 13 and then the user turns the lock to its unlocked or release position. This directs battery 29 current via wire 1 from terminal $a$, relay 11, to switch 13, terminal $d''$ via wire 26, through the switch 13 to output terminal $e''$, out wire 8, where the brake solenoid valve 34 is opened for fluid flow. Current goes back via wire 7 to switch 13, output terminal or pin $a''$ and out to ground via switch 13, pin $b''$. The switch 13 is spring loaded to return to the normal position automatically upon release of the key.

The return to the normal or activated (brakes locked) position is as follows: When the ignition switch 30 is open (i.e.: ignition key off) current through wire 3 is terminated and the deactivated coil 21 of relay 11 permits contacts 14 and 15 to return to the normally closed position. Battery 29 current flows via wire 1 to terminal $a$ of relay 11 in point 14, across the points out of point 15 to terminal $f$, across wire 25 to terminal $a'$ of relay 12. At the same time, coil 20 of relay 12 is activated through terminal $b'$ to ground terminal $c'$, as noted later.

Points 18 and 19 close and current crosses the points and out terminal $d'$, relay 12, to switch 13, terminal $c''$, via wire 27. Current flows through the switch 13 to terminal $a''$ and wire 7. The brake solenoid valve 34 closes, trapping hydraulic fluid pressure in the brake lines 37 and activating brakes 33.

Line pressure is assured as follows: Battery 29 current is at relay 11 terminal $a$ via wire 1 and this current flows out to stop light switch 31 via wire 2. The brakes 33 are activated by depressing the brake pedal of master cylinder 35. Current flows across the switch 31 and out wire 5 to relay 12, terminal $b'$, activating coil 20, and out to ground terminal $c'$. Current flows out of the brake solenoid 34 via wire 8 to the switch 13, terminal $e''$ to ground on terminal 6. The master unit is grounded via wire 9.

Once current is removed from the relay 11, the coil 21 and the points 14 and 15 return to normal, and then current, via wire 4, ceases to hold open the fuel solenoid 32, so that fuel flow is obstructed. The ignition is also deactivated via wire 6 by opening the same circuit within relay 11, terminals $b$ and $e$.

The fuel solenoid valve 32 may be installed anywhere in the fuel system, but usually it will be located between the fuel pump outlet and the carburetor (or fuel injection nozzle) inlet.

It is thus apparent that in order to set the device in a stopped car, the user merely places transmission selector in neutral or park and while keeping his foot on the brake he turns the engine off by turning ignition key to off. Then the foot is removed from the brake.

To release the device the user places the special key into its lock 13, starts the engine in the usual manner and turns the special key to the off position and holds it a moment. Then the special key can be released.

Figure 2:
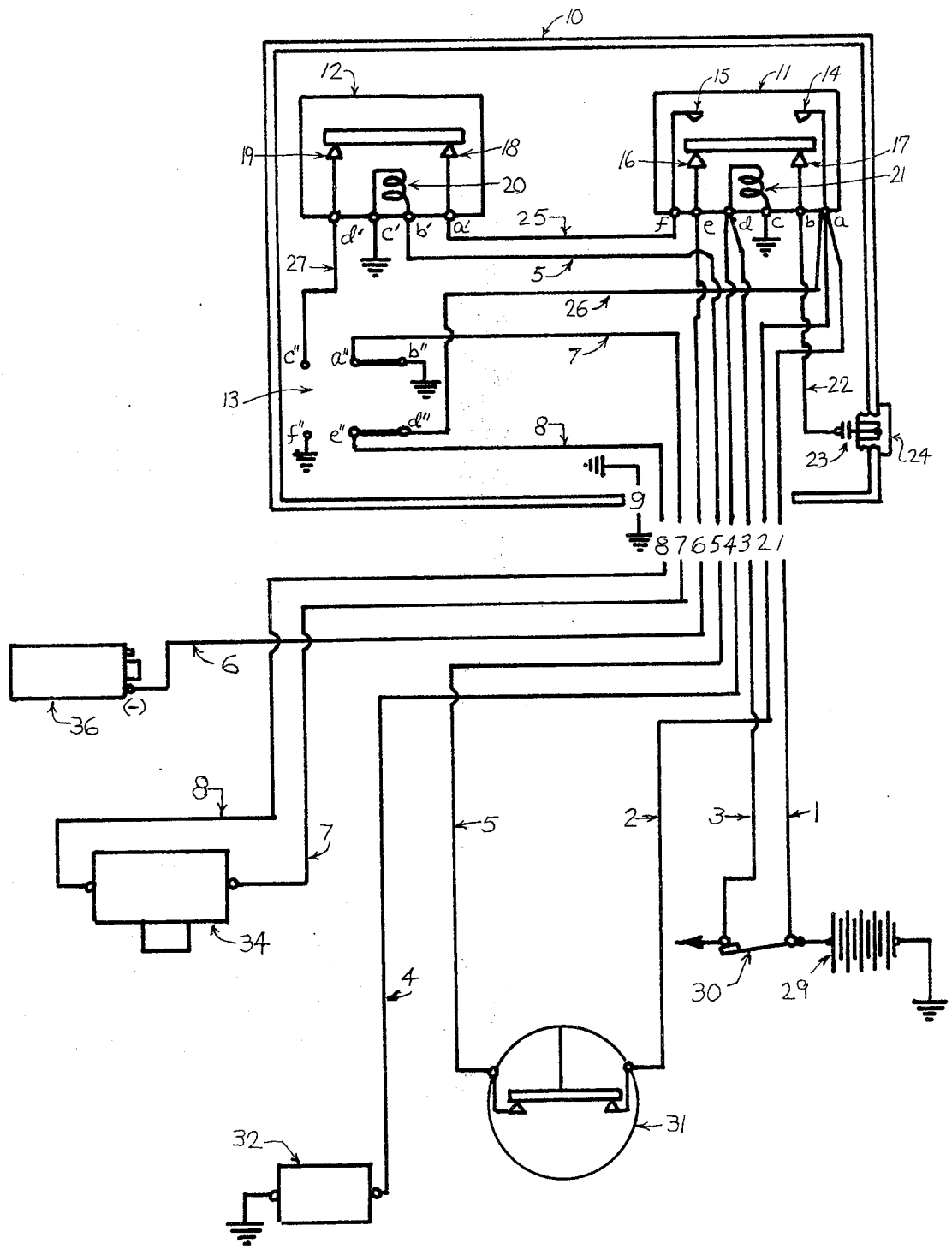
FIG. 2 is a similar diagram showing the device in its off position.
Figure 3:
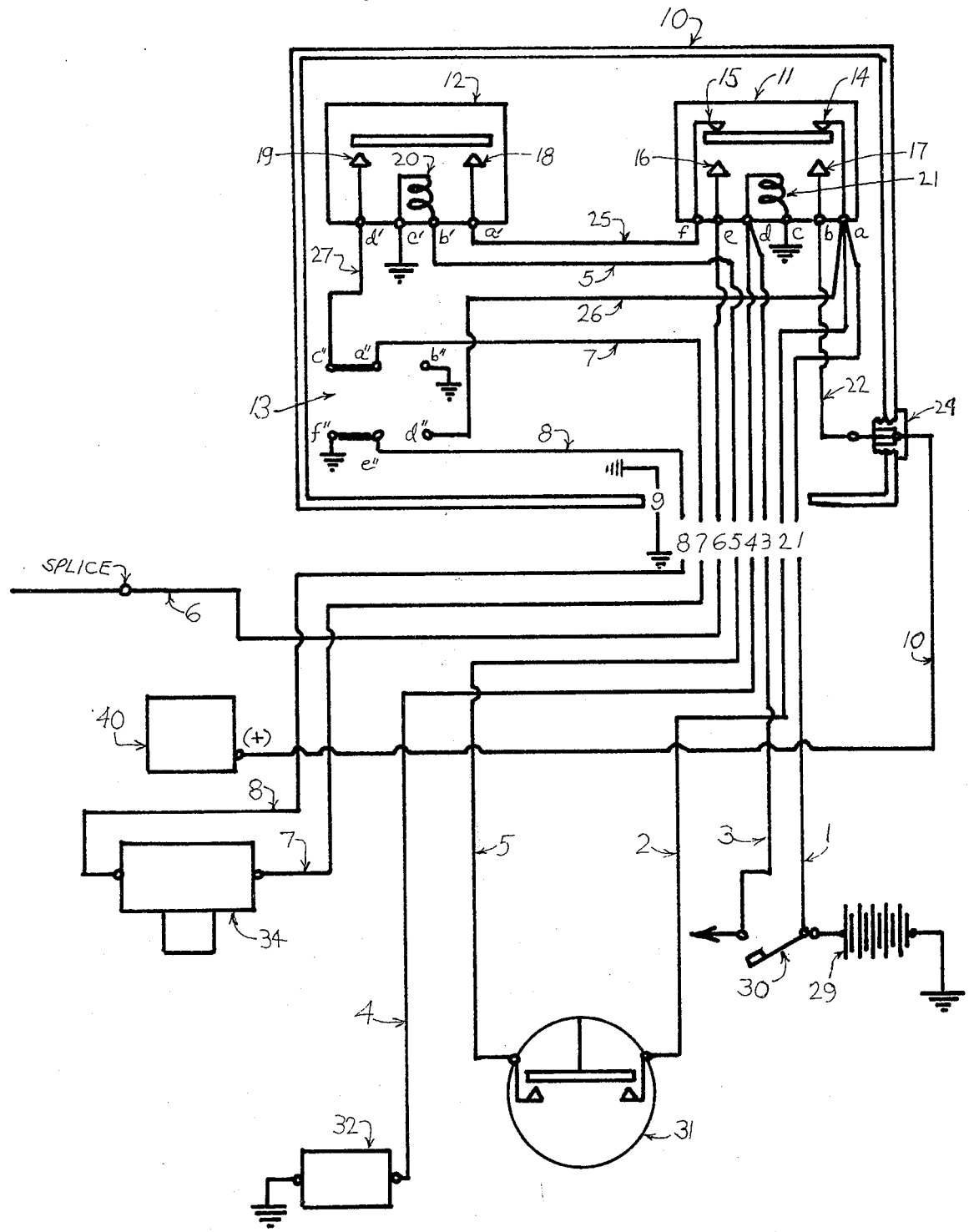
FIG. 3 is a diagram illustrating the use of the device with a transistor ignition.

The device shown in FIGS. 1 and 2 is used for a standard coil ignition. FIG. 3 shows the use of the device with a transistor-solid state ignition. In that case the cap 24 is made of plastic material and is connected with a wire 10 leading to the input of transformer 40. The terminals $b$ and $e$ of the relay 11 provide a connection between the wire 10 and the wire 6 leading to the existing vehicle input lead by means of a splice. The terminal $d$, relay 11, will direct current to the fuel solenoid valve 32 through the wire 4. The basic construction is essentially the same as that shown in FIGS. 1 and 2.

Figure 4:
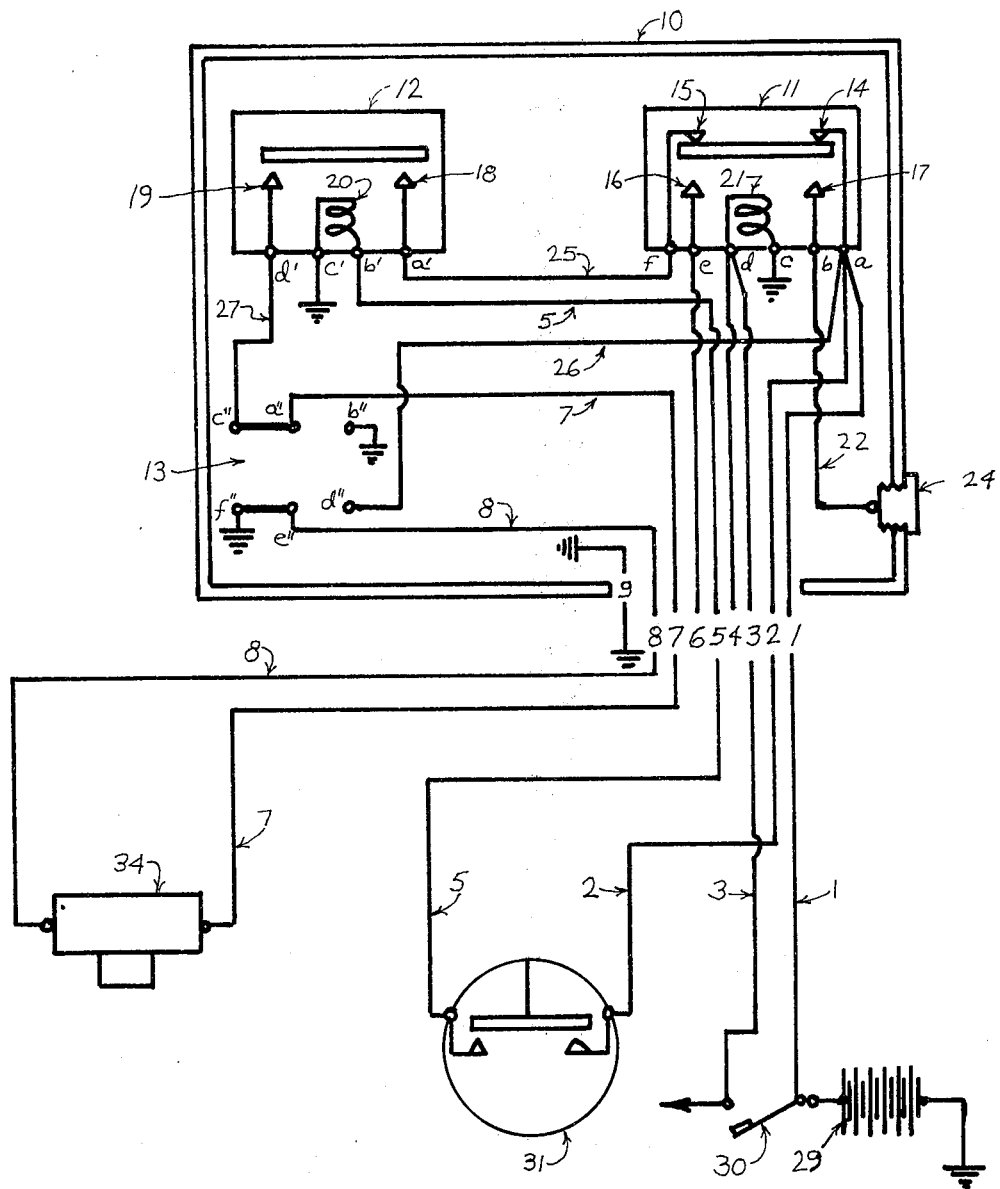
FIG. 4 is a diagram showing a somewhat simplified installation.

FIG. 4 shows an antitheft locking device of a simplified installation wherein the fuel solenoid valve shut off and the ignition deactivation system are eliminated. The lock feature is still effective since the brakes are locked. Similar parts are indicated by the same numerals.

It is apparent that other changes may be made in the locking mechanism of the present invention within the scope of the appended claims. Thus the brakes can be locked mechanically as well as electrically.

The various component parts shown above can be combined, relocated or repositioned to suit installation requirements.

I claim:

1. An anti-theft locking device for a motor vehicle having a hydraulic brake system and an ignition switch, the device comprising a double-pole, double-throw switch with each pole having a movable contact and two fixed contacts, said movable contacts being together movable between normal and off positions, one of the fixed contacts in the off position of a first one of said poles being grounded and one of the fixed contacts in the normal position of a second one of said poles being grounded to thereby ground the movable contact of said first pole only in the off position thereof and ground the movable contact of said second pole only in the normal position thereof; a brake solenoid valve cooperating with the vehicle hydraulic brake system and having a pair of electrical terminals each of which is connected to different ones of said movable contacts and through which reversible currents may be caused to flow, the direction of current flow determining the braking and releasing action of said valve, application of a voltage to one of said terminals resulting in locking of the brakes and application of a voltage to the other of said terminals resulting in release of the brakes; and actuation means connected to the ignition switch and to the other of the fixed contacts of said one pole for supplying a voltage from a battery to said one of said valve terminals only when the ignition switch is off and the brake is actuated and the movable contacts are in the normal position, the other of the other fixed contacts being connected to the battery for supplying a voltage at the other of said valve terminals when said movable contacts are in the off position.

2. An anti-theft locking device for a motor vehicle as defined in claim 1, wherein said actuation means comprises first relay means connected to the ignition switch for providing an output voltage corresponding to the battery voltage only when the ignition switch is open; a brake actuated switch connected to the battery; and second relay means connected to said brake actuated switch and to said first relay means for providing an output voltage corresponding to the battery voltage from said first relay means only when said brake-actuated switch is closed, said second relay means being connected to the other of said fixed contacts of said one pole for supplying the battery voltage thereto.

3. A locking device as defined in claim 2, wherein said first relay means is a first relay having a coil connected to the ignition switch and having a pair of normally closed contacts, one of the normally closed contacts being connected to the battery and the other of the normally closed contacts being connected to said second relay means, whereby the battery voltage is applied by means of said pair of normally closed contacts to said second relay means only when the ignition switch is open, said voltage being removed from said second relay means upon closing of the ignition switch and actuation of said first relay with attendant opening of said pair of normally closed contacts.

4. A locking device as defined in claim 3, wherein said second relay means comprises a further relay having a coil connected to said brake actuated switch and having a pair of normally open contacts, one of the normally open contacts being connected to the other of said closed contacts of said first mentioned relay and the other of the normally open contacts being connected to said other of said fixed contacts of said one pole, the battery voltage being applied to said one pole by way of said normally open contacts only when said brake actuated switch is closed and the battery is connected to said coil of said further relay.

5. A locking device as defined in claim 3, wherein said first relay has a further pair of normally open contacts interposed between an ignition capacitor and ignition coil of the motor vehicle, whereby the ignition circuit of the vehicle is disabled when the ignition switch opens.

6. A locking device as defined in claim 3, wherein a fuel solenoid is provided and connected to the the ignition switch, whereby said fuel solenoid is actuated only when the ignition switch is closed.

7. A locking device as defined in claim 3, wherein said first relay has a further pair of normally open contacts interposed in the series line connection of the capacitor and transformer of a transistor ignition system of the vehicle.

* * * * *